US008164792B2

(12) United States Patent
Ito et al.

(10) Patent No.: US 8,164,792 B2
(45) Date of Patent: Apr. 24, 2012

(54) PRINTING DEVICE, PRINTING METHOD, AND PROGRAM

(75) Inventors: Tatsumi Ito, Kanagawa (JP); Yuichiro Ikemoto, Kanagawa (JP); Koji Ashizaki, Tokyo (JP); Takeshi Matsui, Tokyo (JP); Shintaro Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 419 days.

(21) Appl. No.: 12/474,842

(22) Filed: May 29, 2009

(65) Prior Publication Data

US 2009/0296123 A1 Dec. 3, 2009

(30) Foreign Application Priority Data

May 30, 2008 (JP) ................................ 2008-143631

(51) Int. Cl.
*G06F 15/00* (2006.01)

(52) U.S. Cl. ............. 358/1.9; 347/15; 358/501; 358/2.1

(58) Field of Classification Search .................. 358/1.9, 358/501, 2.1; 347/15
See application file for complete search history.

(56) References Cited

U.S. PATENT DOCUMENTS

| | | | | |
|---|---|---|---|---|
| 7,819,495 | B2 * | 10/2010 | Ito et al. | 347/15 |
| 2008/0238960 | A1 | 10/2008 | Ito et al. | |

FOREIGN PATENT DOCUMENTS

| | | |
|---|---|---|
| JP | 9-265760 | 10/1997 |
| JP | 2005-205636 | 8/2005 |
| JP | 2008-47272 | 2/2008 |

OTHER PUBLICATIONS

U.S. Appl. No. 12/396,812, filed Mar. 3, 2009, Ito, et al.
U.S. Appl. No. 12/404,758, filed Mar. 16, 2009, Ito, et al.

* cited by examiner

*Primary Examiner* — Twyler Haskins
*Assistant Examiner* — Michael Burleson
(74) *Attorney, Agent, or Firm* — Oblon, Spivak, McClelland, Maier & Neustadt, L.L.P.

(57) ABSTRACT

A printing device includes a controlling section that converts visible information, expressed using biaxial orthogonal coordinate data, into polar coordinate data, and binarizes the polar coordinate data to generate binarized polar coordinate data. Next, the controlling section performs landing position correction on the binarized polar coordinate data, and generates ink discharge data in which displacements of landing positions of ink drops, caused by the order in which the ink drops are discharged from discharge nozzles, are corrected.

5 Claims, 12 Drawing Sheets

DOT DENSITY CORRECTION
W=1.0
W=0.5
Floyd & Steinberg TYPE
ERROR DIFFUSION
A1 A2 A3 A4 A5 A6 A7 A8
B1 B2 B3 B4 B5 B6 B7 B8
C1 C2 C3 C4 C5 C6 C7 C8
D1 D2 D3 D4 D5 D6 D7 D8
E1 E2 E3 E4 E5 E6 E7 E8
F1 F2 F3 F4 F5 F6 F7 F8
255 255 255 255
255 255 255 255
127 127 127 127
127 127 127 127
0 255 255 0
255 0 255 255

PRINTING DEVICE, PRINTING METHOD, AND PROGRAM

BACKGROUND OF THE INVENTION

1. Field of the Invention

The present invention relates to a printing device and a printing method for printing visible information by rotating a print object, such as a disc recording medium or a semiconductor storage medium, and by discharging ink drops onto a print surface of the rotating print object; and to a program for executing operations of the printing method.

2. Description of the Related Art

In recent years, disc recording media, such as a compact disk (CD) and a digital versatile disk (DVD), are widely used as recording media for recording information, such as an image or sound, in digitized form. Some of these disc recording media are provided with print surfaces (label surfaces) onto which information (visible information) regarding recorded content can be printed by a printer.

Hitherto, in order to print visible information onto a label surface of a disc recording medium, it has been necessary to use a dedicated printer differing from a recording device that records information, such as an image or sound, onto a recording surface of the disc recording medium. Therefore, it is troublesome to record information, such as an image or sound, onto the recording surface of the disc recording medium and the print visible information regarding recorded content onto the label surface.

Therefore, a device which can record information, such as an image or sound, onto a recording surface of a disc recording medium, and print visible information regarding recorded content onto a label surface has been proposed.

Such a device is discussed in, for example, Japanese Unexamined Patent Application Publication No. 09-265760 (Patent Document 1). Patent Documents 1 discusses, in particular, an optical disc device that can perform printing on a replaceable optical disc. The optical disc device discussed in Patent Document 1 is formed so as to be capable of recording information, such as an image or sound, onto an optical disc and reproducing information recorded on the optical disc. The optical disc device includes a print head that performs printing on the optical disc, a print head driving section that moves the print head in a radial direction of the optical disc, a main shaft motor that rotates the optical disc, and a controlling section that controls the print head, the print head driving section, and the main shaft motor.

SUMMARY OF THE INVENTION

However, in the optical disc device discussed in Patent Document 1, when a plurality of ink drops are ejected at the same time from the print head, a large amount of drive current flows at the same time with respect to the print head. Therefore, a power source is increased in size.

In contrast, in order to reduce the amount of drive current flowing at the same time to the print head, an ink ejection timing may be shifted, that is, a plurality of nozzles that eject ink may be driven so that the driving is divided with each predetermined time. However, when the plurality of nozzles that eject ink are driven so that driving is divided with each predetermined time, the positions onto which the ink lands are displaced due to the order in which the ink is ejected. Therefore, printed visible information may become distorted.

In view of the aforementioned problem, it is desirable to provide a printing device, a printing method, and a printing program in which printed visible information does not become distorted even if the visible information is printed by discharging ink drops at two or more timings from a plurality of discharge nozzles to a rotating print object.

According to an embodiment of the present invention, there is provided a printing device including a rotationally driving section that rotates a print object, a print head having a plurality of discharge nozzles that are arranged in a radial direction of a circle traced by the print object being rotated by the rotationally driving section, and a controlling section that generates ink discharge data for discharging ink drops from the print head. The print head discharges the ink drops at two or more timings from the plurality of discharge nozzles. The controlling section converts visible information expressed by biaxial orthogonal coordinate data into polar coordinate data, and binarizes the polar coordinate data to generate binarized polar coordinate data. In addition, the controlling section performs landing position correction that corrects displacement of a landing position of an ink drop (the displacement being caused by the order in which the ink drops are discharged from the respective discharge nozzles), and generates ink discharge data from the binarized polar coordinate data.

According to another embodiment of the present invention, there is provided a printing method. In this method, first, visible information expressed using biaxial orthogonal coordinate data is converted into polar coordinate data. Then, binarized polar coordinate data is generated by binarizing the polar coordinate data. Thereafter, ink discharge data is generated from the binarized polar coordinate data by performing landing position correction to correct displacements in landing positions of ink drops, the displacements being caused by the order in which the ink drops are discharged from discharge nozzles provided at a print head. Then, the visible information is printed onto a print object by discharging the ink drops at two or more timings from the print head on the basis of the ink discharge data, the print object being rotated by a rotationally driving section.

According to the embodiments of the present invention, the ink discharge data is generated by performing the landing position correction (that corrects displacement of a landing position of an ink drop caused by the order in which the ink drops are discharged from the respective discharge nozzles) on the binarized polar coordinate data. Since the ink discharge data is data that considers the amount of displacement of a landing position of an ink drop, it is possible for the ink drops discharged from the respective discharge nozzles to land on predetermined positions of the print object.

The printing device, the printing method, and a program according to the embodiments of the present invention make it possible to perform a printing operation which considers displacement in a landing position of an ink drop, and to prevent visible information printed on the print object from becoming distorted.

DESCRIPTION OF THE PREFERRED EMBODIMENTS

Best modes for achieving a back projection display device according to an embodiment of the present invention will hereunder be described with reference to the drawings. However, the present invention is not limited to the following modes.

Exemplary Structure of Device

First, the structure of an optical disc device 1 (recording medium driving device), which is a printing device according to a first embodiment of the present invention, will be described with reference to FIGS. 1 and 2.

Figure 1:
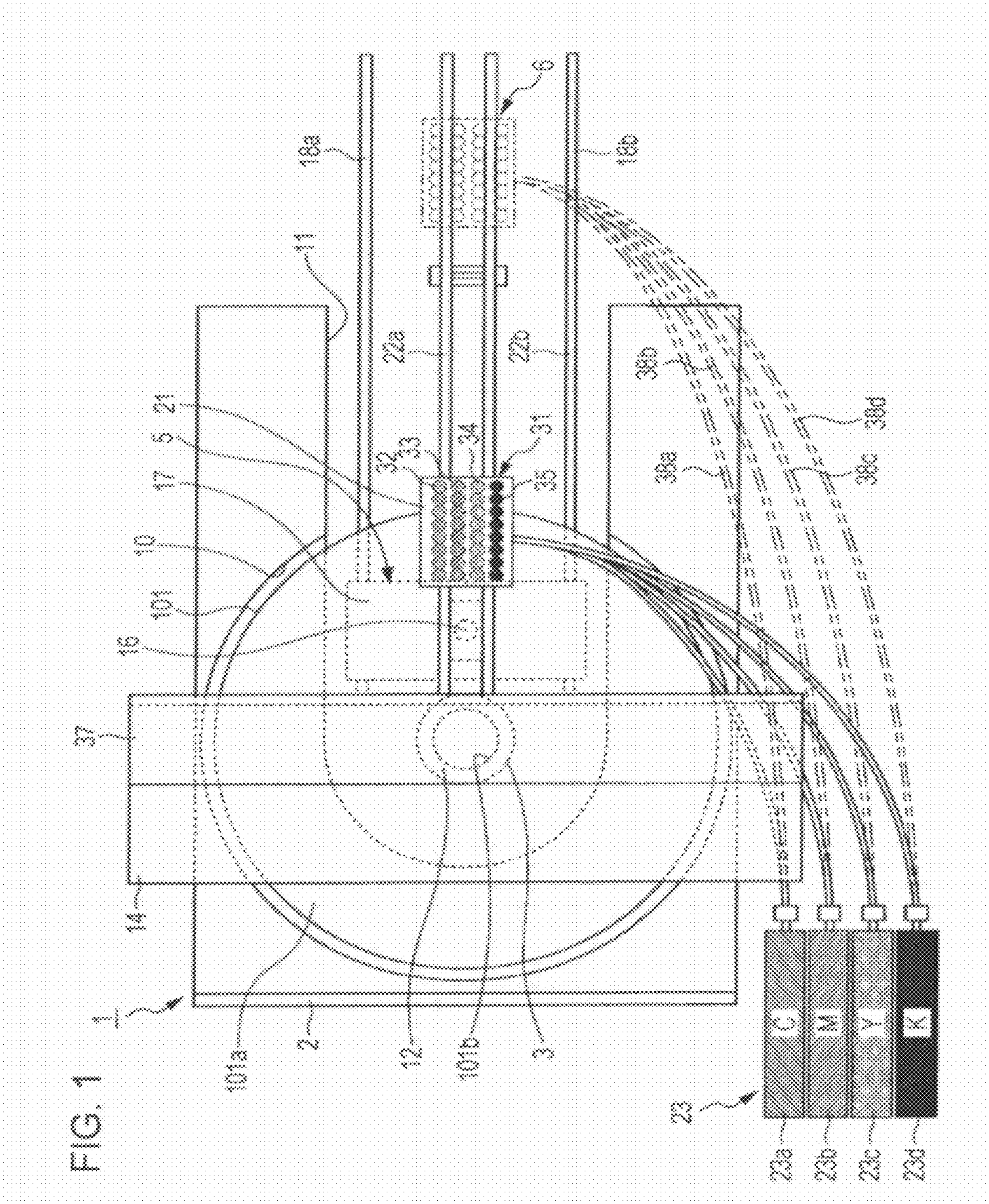
FIG. 1 is a top view of the main structure of an optical disc device, which is a printing device according to a first embodiment of the present invention.
Figure 2:
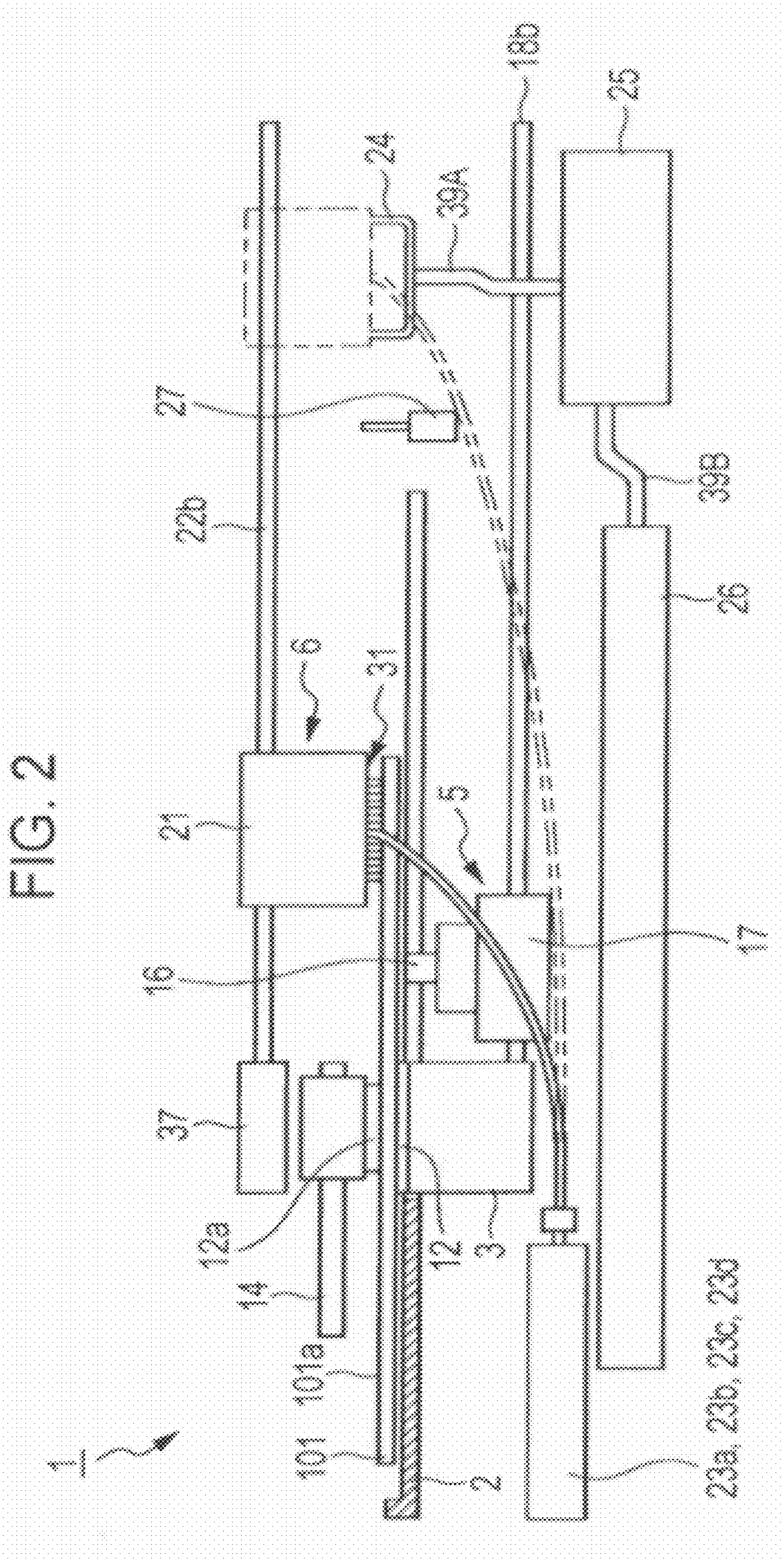
FIG. 2 is a side view of the main structure of the optical disc device, which is the printing device according to the first embodiment of the present invention.

FIG. 1 is a top view of the main structure of the optical disc device 1. FIG. 2 is a side view of the main structure of the optical disc device 1, The optical disc device 1 records (writes) a new information signal to and reproduces (reads out) a previously recorded information signal from an information recording surface of a recording medium (for example, an optical disc 101, such as a CD or a DVD), which is a specific example of a print object. In addition, the optical disc device 1 is formed so that visible information (such as characters or pictures) can be printed onto a label surface 101*a* (which is a specific example of a print surface) of the optical disc 101.

Figure 3:
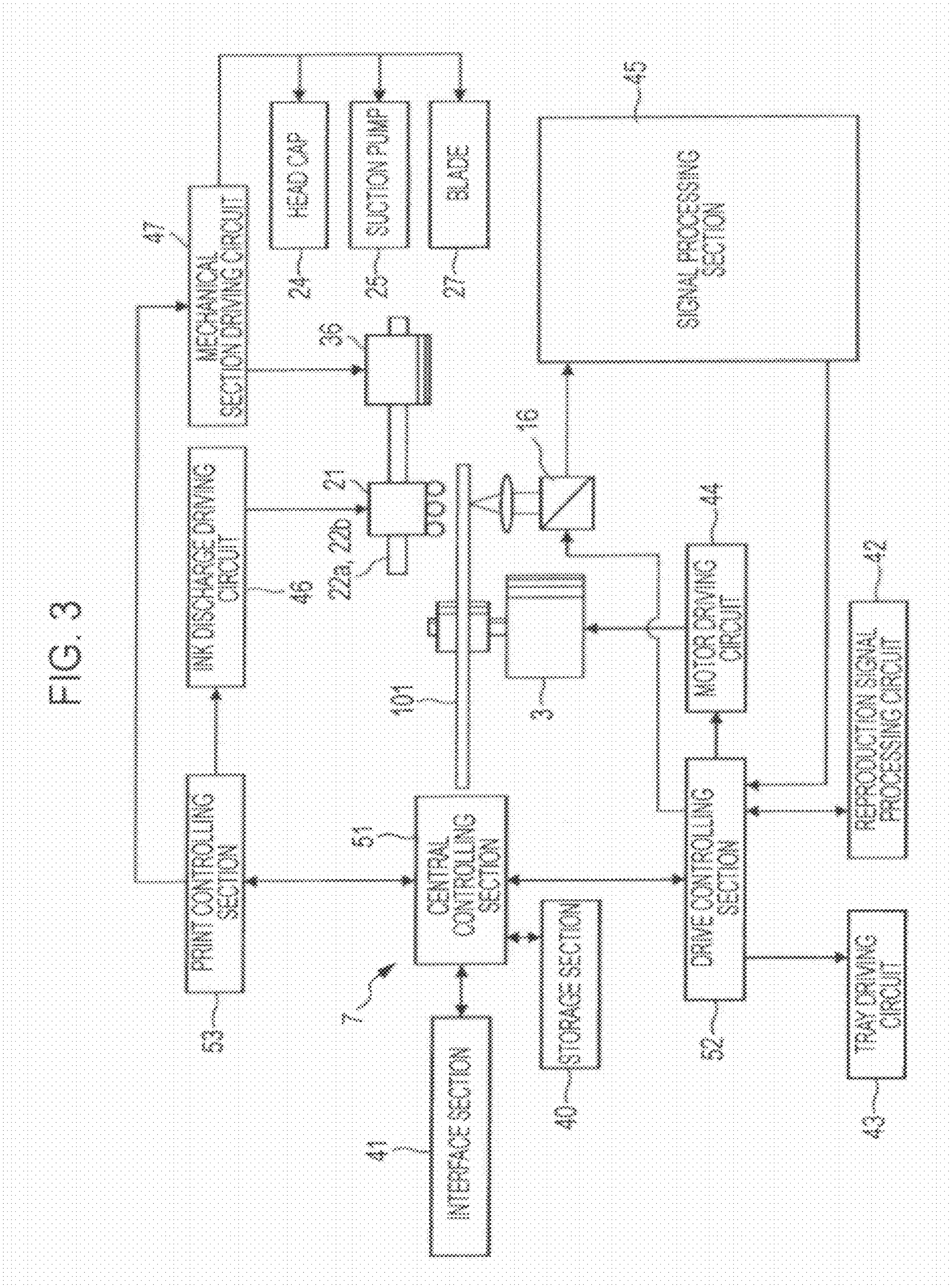
FIG. 3 is a block diagram showing an exemplary structure of a controlling circuit of the optical disc device, which is the printing device according to the first embodiment of the present invention.

The optical disc device 1 includes, for example, a tray 2, a spindle motor 3, a recording and/or reproducing section 5, a printing section 6, and a controlling section 7 (see FIG. 3).

The tray 2 of the optical disc device 1 is formed of a plate-like member that is slightly larger than the optical disc 101 and that is rectangular in a plane. The tray 2 conveys the optical disc 101. An upper surface (which is one of the planar surfaces) of the tray 2 is provided with a disc accommodating section 10 having a circular recess for accommodating the optical disc 101. The tray 2 is provided with a cutaway portion 11 for preventing the tray 2 from contacting, for example, the spindle motor 3 or the recording and/or reproducing section 5. The cutaway portion 11 is large and extends from one of the short sides of the tray 2 to the central portion of the disc accommodating section 10.

The tray 2 is movable in a longitudinal direction (which is a planar direction) by a tray moving mechanism (not shown). The tray moving mechanism selectively conveys the tray 2 from a disc move-in position where the tray 2 protrudes outward from a device housing (not shown) to a disc mounting position where the tray 2 is inserted in the device body. When the tray 2 is conveyed to the disc move-in position, a user can place the optical disc 101 in the disc accommodating section 10 of the tray 2, or remove the optical disc 101 placed in the disc accommodating section 10. When the tray 2 is conveyed to the disc mounting position, the optical disc 101 placed in the disc accommodating section 10 is mounted to a turntable 12 (described later) of the spindle motor 3.

The spindle motor 3 is a specific example of a rotationally driving section that rotationally drives the optical disc 101 conveyed by the tray 2. The spindle motor 3 is secured to a motor base (not shown), and opposes a substantially central portion of the disc accommodating section 10 of the tray 2 conveyed to the disc mounting position. The turntable 12 is provided at an end of a rotary shaft of the spindle motor 3. The turntable 12 has a disc fitting portion 12*a* that can be mounted to and removed from a center hole 101*b* of the optical disc 101.

When the tray 2 is conveyed to the disc mounting position, the motor base is raised by a raising-lowering mechanism (not shown), so that the spindle motor 3 and the turntable 12 move upward. At this time, the disc fitting portion 12*a* of the turntable 12 is fitted to the center hole 101*b* of the optical disc 101, and the optical disc 101 is raised from the disc accommodating section 10 by a predetermined distance. This causes the optical disc 101 to be set in a state in which it can rotate together with the turntable 12. When the spindle motor 3 rotates, the optical disc 101 rotates.

When the spindle motor 3 is lowered by the raising-lowering mechanism, the disc fitting portion 12*a* of the turntable 12 is moved downward and out of the center hole 101*b* of the optical disc 101. This causes the turntable 12 to be removed from the optical disc 101, so that the optical disc 101 is placed in the disc accommodating section 10. In this state, when the tray 2 is moved away from the spindle motor 3 by operating the tray moving mechanism, the front portion of the tray 2 projects from the device housing by a predetermined amount.

A chucking section 14 is provided above the spindle motor 3. From above the optical disc 101, the chucking section 14 holds down the optical disc 101 raised by raising the spindle motor 3. That is, the optical disc 101 is clamped by the chucking section 14 and the turntable 12. Therefore, the optical disc 101 is not dislodged from the turntable 12 even if the spindle motor 3 rotates.

The recording and/or reproducing section 5 writes information to and/or reads out the information from the information recording surface of the optical disc 101 being rotated by the spindle motor 3. The recording and/or reproducing section 5 includes, for example, an optical pickup 16, a pickup base 17 to which the optical pickup 16 is mounted, and two first guide shafts 18*a* and 18*b* that guide the pickup base 17 in a radial direction of the optical disc 101.

The optical pickup 16 records (writes) an information signal by irradiating the information recording surface of the optical disc 101 with laser light, and reproduces (reads out) an information signal previously recorded on the information recording surface by receiving laser light reflected and returning from the information recording surface.

The optical pickup 16 includes a light source, an objective lens, a biaxial actuator, and a photodetector. The light source includes, for example, a laser diode, and emits laser light. The objective lens converges the laser light emitted from the light source, to irradiate the information recording surface of the optical disc 101 with the laser light. The biaxial actuator causes the objective lens to face the information recording surface of the optical disc 101. The photodetector includes, for example, a photodiode, and reads information recorded on the information recording surface by receiving the light reflected and returning from the information recording surface of the optical disc 101.

The optical pickup 16 is mounted to the pickup base 17, and moves together with the pickup base 17. The first guide shafts 18*a* and 18*b*, disposed in a radial direction of the optical disc 101 (that is, in a direction parallel to the direction of movement of the tray 2 in the embodiment), are slidably inserted into the pickup base 17. The pickup base 17 is made movable along the first guide shafts 18*a* and 18*b* by a pickup moving mechanism (not shown), provided with a pickup motor. When the pickup base 17 moves, a recording operation and/or a reproducing operation of an information signal is performed on the information recording surface of the optical disc 101 by the optical pickup 16.

As the pickup moving mechanism that moves the pickup base 17, for example, a feed screw mechanism may be used. However, the pickup moving mechanism is not limited to a feed screw mechanism, so that, for example, other mechanisms, such as a rack pinion mechanism, a belt feed mechanism, or a wire feed mechanism, may also be used.

The printing section 6 prints visible information, such as characters or an image, onto the label surface 101*a* of the rotating optical disc 101. The printing section 6 includes, for example, a print head 21, two second guide shafts 22*a* and 22*b*, an ink cartridge group 23, a head cap 24, a suction pump 25, a waste ink absorbing section 26, and a blade 27.

The print head 21 faces the label surface 101*a* of the optical disc 101. Discharge nozzle groups 31 are provided at the surface of the print head 21 facing the label surface 101*a*. The discharge nozzle groups 31 include four discharge nozzle rows 32 to 35 each including a plurality of discharge nozzles arranged in a radial direction of the optical disc 101 (that is, a radial direction of a circle traced by the rotating optical disc 101). The discharge nozzle rows 32 to 35 are set so that ink drops of predetermined colors are discharged.

In the embodiment, the discharge nozzle groups 31 include the discharge nozzle row 32 for cyan (C), the discharge nozzle row 33 for magenta (M), the discharge nozzle row 34 for yellow (Y), and the discharge nozzle row 35 for black (K). Since the discharge nozzles of the discharge nozzle rows 32 to 35 each discharge, for example, thickened ink, air bubbles, and foreign matter, a dummy discharge operation of ink is performed before and after printing.

The two second guide shafts 22*a* and 22*b* that are parallel to each other are slidably inserted into the print head 21. The print head 21 is made movable along the second guide shafts 22*a* and 22*b* by a head moving mechanism having a head driving motor 36 (see FIG. 3). One end of each of the guide shafts 22*a* and 22*b* is secured to a guide shaft supporting member 37 that extends in a direction intersecting with the direction of movement of the tray 2. The other end of each of the guide shafts 22*a* and 22*b* extends in a direction opposite to the direction of movement of the tray 2. When printing is not performed on the optical disc 101, the print head 21 is moved by the head moving mechanism, and retreats to a standby position at an outer side of the optical disc 101 in a radial direction thereof.

The ink cartridge group 23 includes an ink cartridge 23*a* for cyan (C), an ink cartridge 23*b* for magenta (M), an ink cartridge 23*c* for yellow (Y), and an ink cartridge 23*d* for black (K). These ink cartridges 23*a* to 23*d* supply ink to the discharge nozzles of the respective discharge nozzle rows 32 to 35.

Each of the ink cartridges 23*a* to 23*d* includes a hollow container, and stores ink by capillarity of porous material in the container. Openings of the ink cartridges 23*a* to 23*d* are removably connected to connection portions 38*a* to 38*d*, respectively, and are connected to the discharge nozzles of the discharge nozzle rows 32 to 35, respectively, through the respective connection portions 38*a* to 38*d*. Therefore, when the containers run out of ink, it is possible to remove the ink cartridges from the respective connection portions, and easily replace them with new ink cartridges.

The head cap 24 is provided at the standby position of the print head 21, and is mounted to the surface of the print head 21, moved to the standby position, where the discharge nozzle groups 31 are provided. This prevents drying of ink included in the print head 21, and adhesion of, for example, dust to the discharge nozzles of the discharge nozzle rows 32 to 35. The head cap 24 has a porous layer, and temporarily holds ink that has been dummy discharged from the discharge nozzles of the discharge nozzle rows 32 to 35. In this case, the internal pressure of the head cap 24 is adjusted so as to be equal to atmospheric pressure by a valve mechanism (not shown).

The suction pump 25 is connected to the head cap 24 through a tube 39A. When the head cap 24 is mounted to the print head 21, the suction pump 25 applies negative pressure to the space in the head cap 24. This causes ink in the discharge nozzles of the discharge nozzle rows 32 to 35 and ink that is dummy discharged from the discharge nozzles and temporarily held in the head cap 24 to be sucked. The waste ink absorbing section 26 is connected to the suction pump 25 through a tube 39B, and accommodates the ink sucked by the suction pump 25.

The blade 27 is disposed between the standby position and a printing position of the print head 21. When the print head 21 moves between the standby position and the printing position, the blade 27 comes into contact with the front end surfaces of the discharge nozzles of the discharge nozzle rows 32 to 35 to wipe of, for example, dust or ink adhered to the front end surfaces of the discharge nozzles. By providing a moving mechanism that moves the blade 27 in an up-down direction, it is possible to determine whether or not to wipe or not wipe the discharge nozzles of the discharge nozzle rows 32 to 35.

Exemplary Structure of Controlling Circuit

Next, the structure of a controlling circuit of the optical disc device 1 will be described with reference to FIG. 3.

FIG. 3 is a block diagram showing an exemplary structure of the controlling circuit of the optical disc device 1.

The controlling circuit of the optical disc device 1 includes, for example, the controlling section 7, a storage section 40, an interface section 41, a reproduction signal processing circuit

42, a tray driving circuit 43, a motor driving circuit 44, a signal processing section 45, an ink discharge driving circuit 46, and a mechanical-section driving circuit 47.

The interface section 41 is a connection section that electrically connects the optical disc device 1 and an external device, such as a personal computer, with each other. The interface section 41 outputs a signal supplied from the external device to the controlling section 7, and outputs a reproduction data signal, read out from the information recording surface of the optical disc 101 by the recording and/or reproducing section 5, to the external device. Examples of the signal supplied to the interface section 41 from the external device are a recording data signal that expresses recording information that is recorded on the information recording surface of the optical disc 101, and a print data signal that expresses visible information that is printed on the label surface 101*a* of the optical disc 101.

The storage section 40 stores a control program (refer to FIG. 4) that is executed by the controlling section 7, and various data for the control program. The controlling section 7 includes a central controlling section 51, a drive controlling section 52, and a print controlling section 53. The controlling section 7 performs drive control on, for example, the recording and/or reproducing section 5 and the printing section 6.

The central controlling section 51 reads out, for example, the control program, executed by the drive controlling section 52 and the print controlling section 53, from the storage section; and outputs it to the drive controlling section 52 and the print controlling section 53. The central controlling section 51 outputs the recording data signal supplied from the interface section 41 to the drive controlling section 52. Further, the central controlling section 51 outputs the print data signal supplied from the interface section 41 and a position data signal supplied from the drive controlling section 52 to the print controlling section 53.

On the basis of the program supplied from the central controlling section 51, the drive controlling section 52 controls the rotations of a pickup driving motor (not shown) and the spindle motor 3. That is, the drive controlling section 52 outputs a control signal to the motor driving circuit 44, and controls the rotations of the spindle motor 3, the pickup driving motor, and a tray driving motor through the motor driving circuit 44.

The drive controlling section 52 performs drive control on the optical pickup 16 on the basis of the program supplied from the central controlling section 51. That is, the drive controlling section 52 outputs a control signal to the optical pickup 16, and controls a track servo operation and a focus servo operation so that a light beam emitted from the optical pickup 16 follows a track of the optical disc 101.

The signal processing section 45 supplies the position data signal and the reproduction data signal (described later) to the drive controlling section 52. The drive controlling section 52 outputs the position data signal to the central controlling section 51, and the reproduction data signal to the reproduction signal processing circuit 42.

The reproduction signal processing circuit 42, for example, encodes or modulates the reproduction data signal supplied from the drive controlling section 52, and outputs the processed reproduction data signal to the drive controlling section 52. On the basis of the control signal supplied from the drive controlling section 52, the tray driving circuit 43 drives the tray driving motor. This causes the tray 2 to be conveyed to the inside and outside of the device housing.

The motor driving circuit 44 drives the spindle motor 3 on the basis of the control signal output from the drive controlling section 52. This rotationally drives the optical disc 101 mounted to the turntable 12 at the spindle motor 3. The motor driving circuit 44 drives the pickup driving motor on the basis of the control signal output from the drive controlling section 52. This causes the optical pickup 16 to move together with the pickup base 17 in a radial direction of the optical disc 101.

The signal processing section 45 generates the reproduction data signal by, for example, decoding a radio frequency (RF) signal supplied from the optical pickup 16 and detecting an error. On the basis of the RF signal, the signal processing section 45 detects a signal having a particular pattern, such as a synchronizing signal, or the position data signal (which is a signal expressing position data of the optical disc 101). Examples of the position data signal are a rotational angle signal indicating the angle of rotation of the optical disc 101, and a rotational position signal indicating the rotational position of the optical disc 101. As mentioned above, the signal processing section 45 outputs the reproduction data signal and the position data signal to the drive controlling section 52.

On the basis of the program supplied from the central controlling section 51, the print controlling section 53 controls the printing section 6 (including, for example, the print head 21 and the head driving motor 36), and performs printing on the label surface 101*a* of the optical disc 101. The print controlling section 53 obtains the visible information on the basis of the print data signal supplied from the central controlling section 51. Then, on the basis of the visible information, the print controlling section 53 generates ink discharge data. The generation of the ink discharge data will be described in more detail below. The print controlling section 53 generates a control signal used for controlling the printing section 6 on the basis of the generated ink discharge data and the position data signal supplied from the central controlling section 51, and outputs the control signal to the ink discharge driving circuit 46 and the mechanical-section driving circuit 47.

The ink discharge driving circuit 46 drives the print head 21 on the basis of the control signal supplied from the print controlling section 53. This causes ink drops to be discharged from the discharge nozzles of the discharge nozzle rows 32 to 35 (provided at the print head 21) and to be dripped onto the label surface 101*a* of the rotating optical disc 101. On the basis of the control signal supplied from the print controlling section 53, the mechanical-section driving circuit 47 drives the head cap 24, the suction pump 25, the blade 27, and the head driving motor 36. By driving the head driving motor 36, the print head 21 moves in a radial direction of the optical disc 101.

Exemplary Operation of Controlling Section

Next, the process of generating the ink discharge data, executed by the print controlling section 53 on the basis of the program supplied from the central controlling section 51, will be described with reference to FIG. 4.

Figure 4:
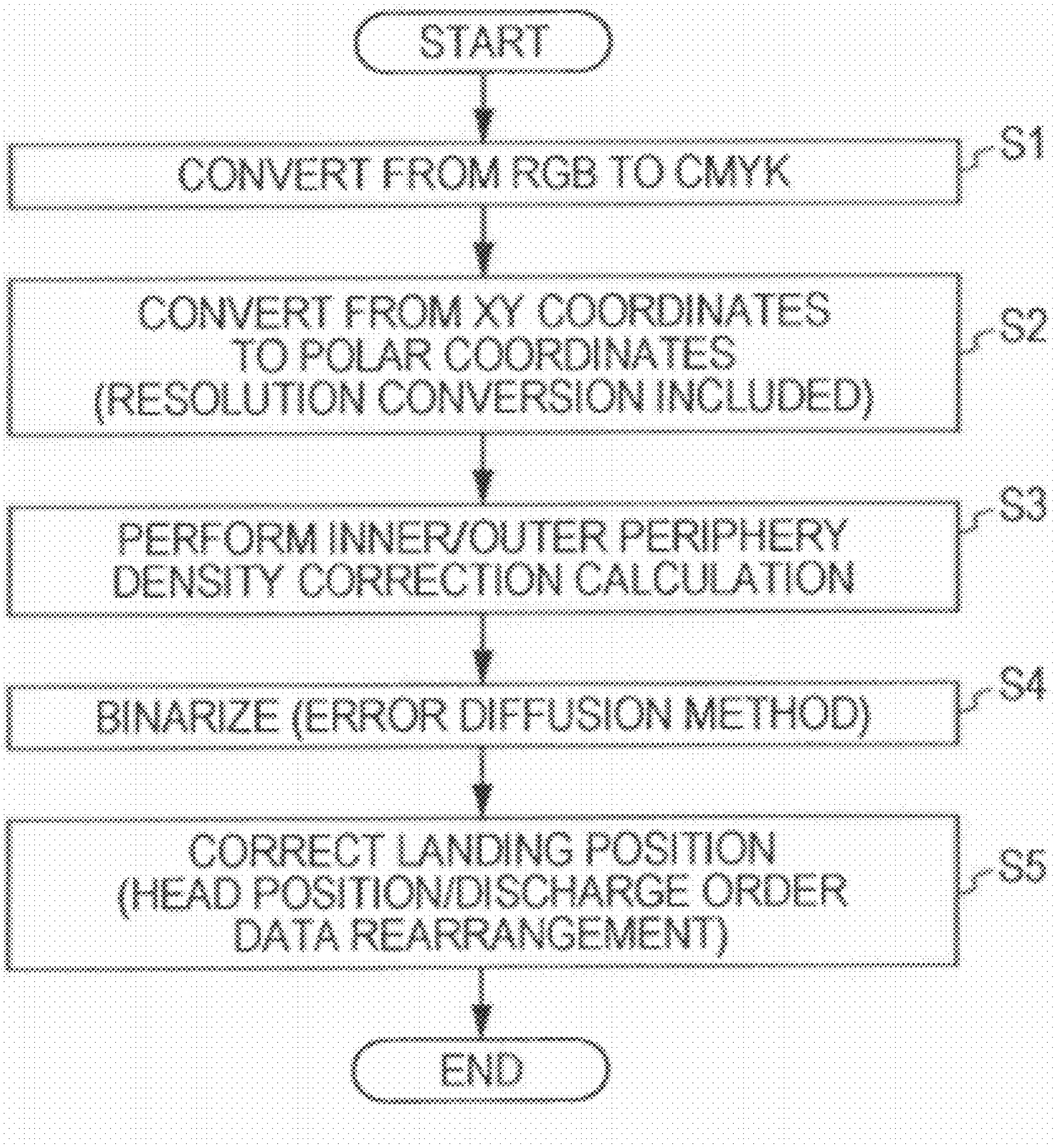
FIG. 4 is a flowchart of the process of generating ink discharge data in the optical disc device, which is the printing device according to the first embodiment of the present invention.

FIG. 4 is a flowchart of the process of generating the ink discharge data on the basis of the visible information.

Here, the visible information will be described. The visible information is handled as image data expressed by distributing a plurality of dots whose colors are set to red (R), green (G), and blue (B) on biaxial orthogonal (X-Y) coordinates. The dots have gradation values that express the brightnesses of their respective colors. The visible information is stored in, for example, an external device, which is provided separately from the information recording surface of the optical disc 101 and the optical disc device 1, and is input to the print controlling section 53 through the central controlling section 51 of the controlling section 7.

First, the image data expressed by the gradation values of the respective colors red (R), green (G), and blue (B) is converted into CMYK data expressed by a distribution of dots (pixels) of the respective colors cyan (C), magenta (M), yellow (Y), and black (K) (Step S1).

The CMYK data is divided into cyan data, magenta data, yellow data, and black data. The cyan data is expressed by a distribution of dots whose color is set to cyan (C). The magenta data is expressed by a distribution of dots whose color is set to magenta (M). Similarly, the yellow data is expressed by a distribution of dots whose color is set to yellow (Y), and the black data is expressed by a distribution of dots whose color is set to black (K).

The dots expressing the CMYK data have gradation values based on the image data. In the embodiment, the gradation values of the dots are from 0 to 255 (8 bits).

In the embodiment, Step S2 and the subsequent steps are carried out with respect to the cyan data, the magenta data, the yellow data, and the black data, which have been divided. Therefore, when it is subsequently explained that the steps are performed on the CMYK data, this means that the steps are carried out with respect to the cyan data, the yellow data, the magenta data, and the black data.

Next, the print controlling section 53 converts the CMYK data expressed by the biaxial orthogonal coordinates into polar coordinate data represented by polar (r-θ) coordinates (Step S2). Here, the print controlling section 53 converts the resolution of the CMYK data by a general method (such as the nearest neighbor method, the bilinear method, or the high cubic method), and forms the polar coordinate data corresponding to the size of the label surface 101*a* of the optical disc 101. The resolution to be converted may be specified by a user, or may be automatically converted by the print controlling section 53.

Next, the print controlling section 53 performs inner/outer periphery density correction calculation with respect to the polar coordinate data (Step S3). That is, the print controlling section 53 performs a dot density correction operation on the polar coordinate data, and generates dot-corrected polar coordinate data. The dot density correction operation is a calculation that adds correction weightings to the gradation values of the dots in the polar coordinate data to adjust the brightnesses expressed by the dots.

Next, the print controlling section 53 binarizes the dot-corrected polar coordinate data by the error diffusion method to generate binarized polar coordinate data (Step S4). The binarized polar coordinate data generated in Step S4 expresses whether ink drops are to be dripped onto the positions corresponding to the respective dots on the label surface 101*a* of the optical disc 101.

In the embodiment, the gradation values of the dots in the dot-corrected polar coordinate data are expressed by 0 to 255 (8-bit values). The gradation values of the dots of the polar coordinate data binarized by the error diffusion method are expressed using values from 0 to 255 (1 bit). In the binarized polar coordinate data, when the gradation values of the dots are 255, ink drops are dripped onto the corresponding positions of the label surface 101*a*. In contrast, when the gradation values of the dots are 0, ink drops are not dripped onto corresponding positions of the label surface 101*a*.

Next, the print controlling section 53 generates the ink discharge data by performing landing position correction on the binarized polar coordinate data (Step S5).

In the embodiment, driving of the discharge nozzle row 32 (as well as the discharge nozzle rows 33 to 35) of the print head 21 is divided with every predetermined time, and carried out. That is, in the discharge nozzle row 32, a timing in which ink drops are discharged is shifted. Therefore, the landing positions of the ink drops are displaced due to the order in which the ink drops are discharged from the discharge nozzle row 32 (as well as from the discharge nozzle rows 33 to 35). In the embodiment the landing positions are corrected for discharging ink drops considering the displacements of the landing positions.

In Step S5, the print controlling section 53 rearranges the pieces of data in accordance with the head position/discharge order. More specifically, the pieces of the ink discharge data are rearranged to a size corresponding to the number of discharge nozzles of the discharge nozzle row 32 provided at the print head 21. Pieces of ink discharge data corresponding to the discharge nozzle rows 33 to 35 are also rearranged to a size corresponding to the number of discharge nozzles of the discharge nozzle rows 33 to 35.

In the embodiment, a range that is printable by the discharge nozzle row 32 (as well as the discharge nozzle rows 33 to 35) is smaller than the entire range of the label surface 101*a*. Therefore, in order to print the entire range of the label surface 101*a*, the print head 21 is moved in a radial direction of the optical disc 101. Consequently, in the embodiment, the pieces of ink discharge data are rearranged to a size corresponding to the number of discharge nozzles of the discharge nozzle rows 32 to 35.

After Step S5, the print controlling section 53 generates a control signal on the basis of the ink discharge data, and outputs the control signal to the ink discharge driving circuit 46. This causes ink drops to be discharged onto the rotating optical disc 101 from the discharge nozzles of the discharge nozzle rows 32 to 35, so that visible information is printed onto the label surface 101*a*. At this time, since the ink drops are discharged considering the displacements in the landing positions, it is possible to present the printed visible information from becoming distorted.

Description of Polar Coordinate Conversion

Next, the conversion from the biaxial orthogonal coordinate data (CMYK data) to the polar coordinate data (that is, the operations carried out in Steps S1 and S2 in the flowchart shown in FIG. 4) will be described with reference to FIGS. 5A to 5C.

Figures 5A, 5B, 5C:
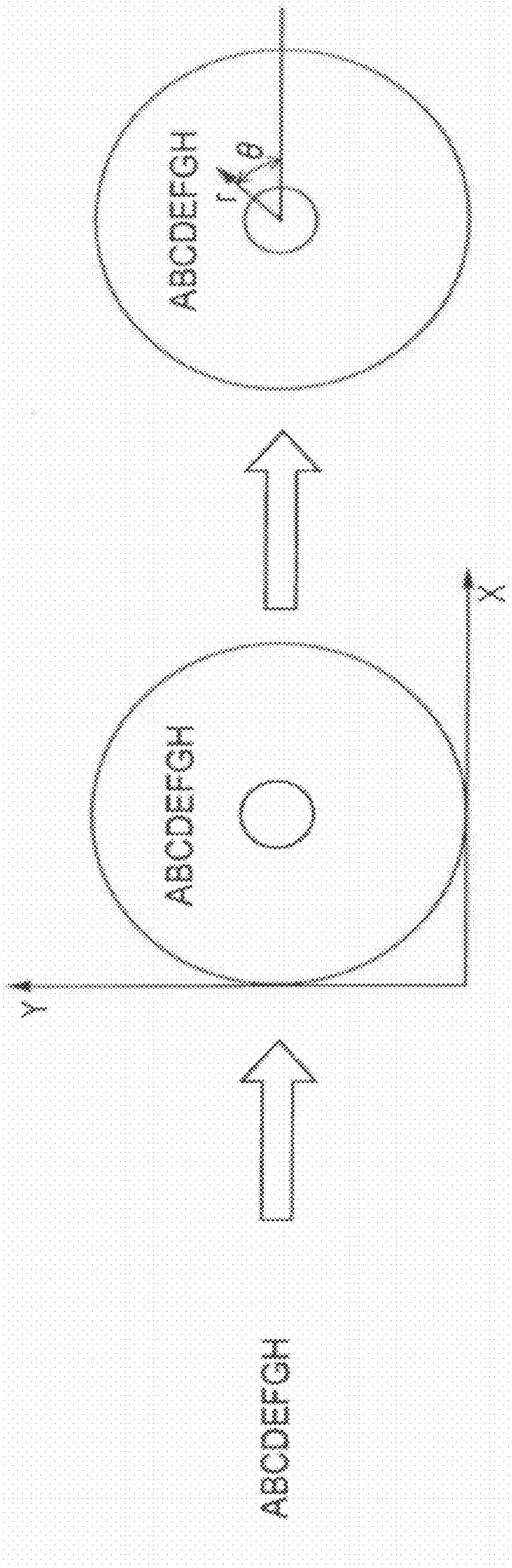
FIGS. 5A to 5C show conversion from biaxial orthogonal coordinate data to polar coordinate data in the optical disc device, which is the printing device according to the first embodiment of the present invention.

FIGS. 5A to 5C show the conversion from the biaxial orthogonal coordinate data to the polar coordinate data.

As shown in FIG. 5A, the visible information is a character string including "ABCDEFGH." It is assumed that the print controlling section 53 has converted the visible information into the CMYK data. In this case, as shown in FIG. 5B, the CMYK data expresses the character string "ABCDEFGH" in a biaxial orthogonal (X-Y) coordinate system. When the print controlling section 53 converts the visible information into the CMYK data, the CMYK data is stored in a memory (not shown).

In order to convert the CMYK data into the polar coordinate data, a radius (r) from the rotational center of the optical disc 101 of each dot in the CMYK data, and an angle (θ) with reference to an origin of a rotational angle are calculated. When the coordinates of each dot in the CMYK data are (X, Y), the coordinates (r, θ) of the polar coordinate data can be calculated by the following expressions:

$$X=r\cos\theta$$

$$Y=r\sin\theta$$

By this, the CMYK data expressed by the biaxial orthogonal (X-Y) coordinates is converted into the polar (r-θ) coordinate data. In the calculation performed for the conversion, a general method, such as the nearest neighbor method or the linear interpolation method, may be used.

Description of Inner/Outer Periphery Density Correction Calculation

Next, the inner/outer periphery density correction calculation (that is, the operation performed in Step S3 in the flowchart shown in FIG. 4) will be described with reference to FIG. 6.

Figure 6:
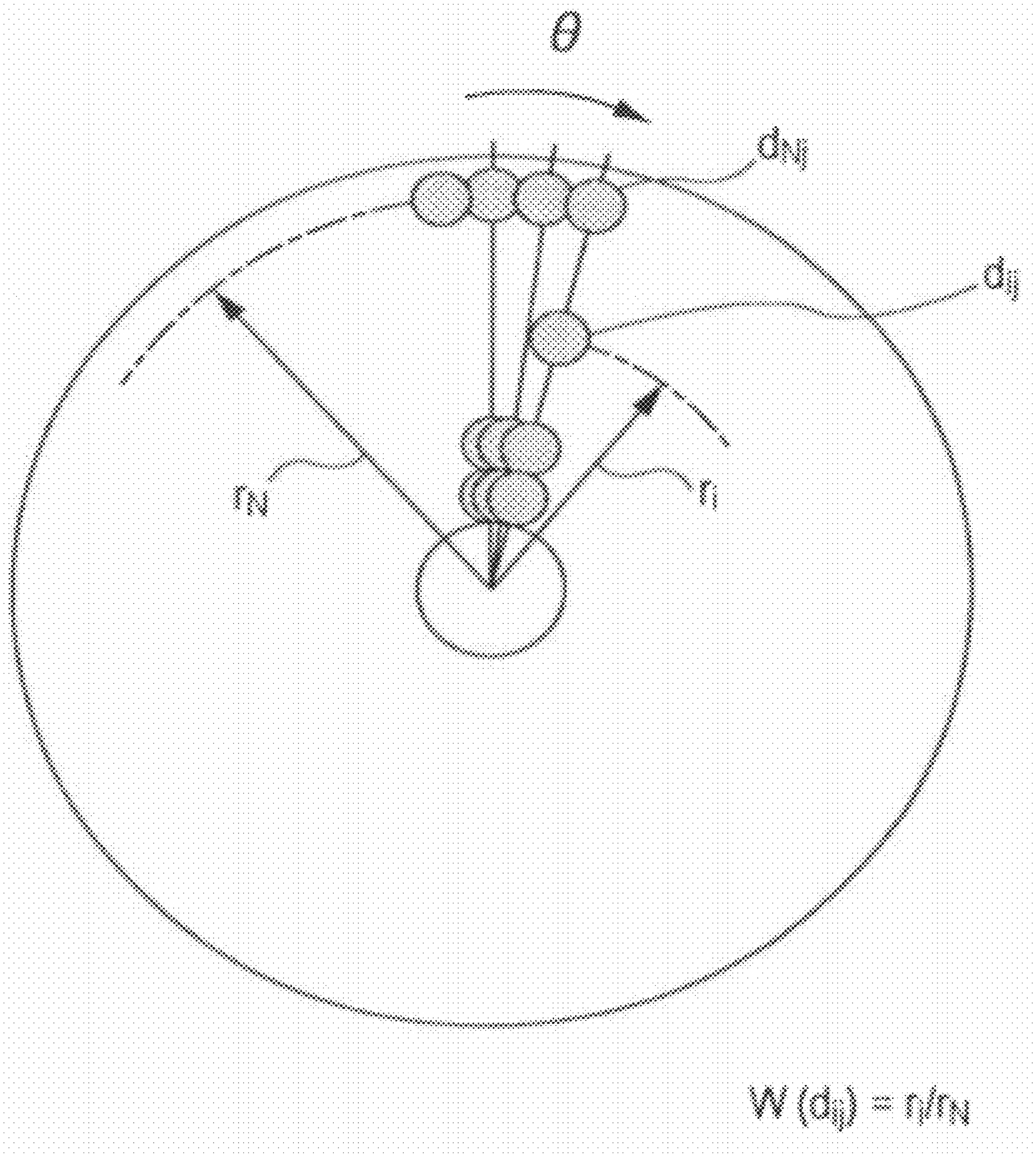
FIG. 6 illustrates correction weighting in an inner/outer periphery density correction calculation in the optical disc device, which is the printing device according to the first embodiment of the present invention.

FIG. 6 illustrates the inner/outer periphery density correction (that is, the dot density correction) calculation.

As described above, the inner/outer periphery density correction (that is, the dot density correction) calculation refers to a calculation for adjusting the brightnesses of the dots by adding correction weightings to the gradation values of the dots of the polar coordinate data. More specifically, the correction weightings for the dots are reduced towards the inner peripheral side of the polar coordinate data. This generates dot-corrected polar coordinate data in which the gradation values of the dots at the inner peripheral side are reduced.

The correction weightings used for the dot density correction are each calculated on the basis of the ratio between the number of dots per unit area centered on a dot to be weighted and the number of dots per unit area centered on a dot positioned at the outermost periphery of the polar coordinate data. For example, if the number of dots per unit area centered on a dot $d_{ij}$ to be weighted is expressed as u, and the number of dots per unit area centered on a dot $d_{Nj}$ positioned at the outermost periphery of the polar coordinate data is expressed as v, weighting $W(d_{ij})$ for the dot $d_{ij}$ is calculated by the following expression:

$$W(d_{ij})v/u$$

The correction weighting W for each dot, calculated as described above, is stored in a memory (not shown), and is read out when dot density correction is carried out. However, if the correction weighting W is calculated for each dot, and is stored in a memory, the storage capacity of the memory is increased. For this reason, in the embodiment, the correction weightings are approximately calculated.

This approximate calculation of the correction weightings will be described with reference to FIG. 6. In the embodiment, the correction weightings for the dot density correction are each approximately calculated on the basis of the ratio between the radius of the dot to be weighted and the radius of the dot positioned at the outermost periphery of the polar coordinate data. The radius represents the distance from the center of the optical disc 101 when ink drops corresponding to the respective dots land on the label surface 101*a* of the optical disc 101.

If the radius of the dot $d_{ij}$ to be weighted is expressed as $r_i$, and the radius of the dot $d_{Nj}$ positioned at the outermost periphery of the polar coordinate data is expressed as $r_N$, the weighting $W(d_{ij})$ for the dot $d_{ij}$ is calculated by the following expression:

$$W(d_{ij})=r_i/r_N$$

For example, if the radius $r_i$ of the dot $d_{ij}$ is 30 mm and the radius $r_N$ of the dot $d_{Nj}$ is 60 mm, the weighting $W(d_{ij})$ for the dot $d_{ij}$ is 0.5.

If the correction weighting W for each dot is calculated as described above, it is possible to perform the same correction weighting for dots at the same radius and to reduce the number of correction weightings to be stored in the memory. As a result, it is possible to reduce the capacity of the memory and to reduce the power consumed by the memory.

Description of Binarization

Next, binarization of the dot-corrected polar coordinate data (that is, the operation carried out in Step S4 in the flowchart shown in FIG. 4) will be described with reference to FIGS. 7A to 7F.

FIGS. 7A to 7F illustrate the binarization of the dot-corrected polar coordinate data.

Figures 7A, 7B, 7C, 7D, 7E, 7F:
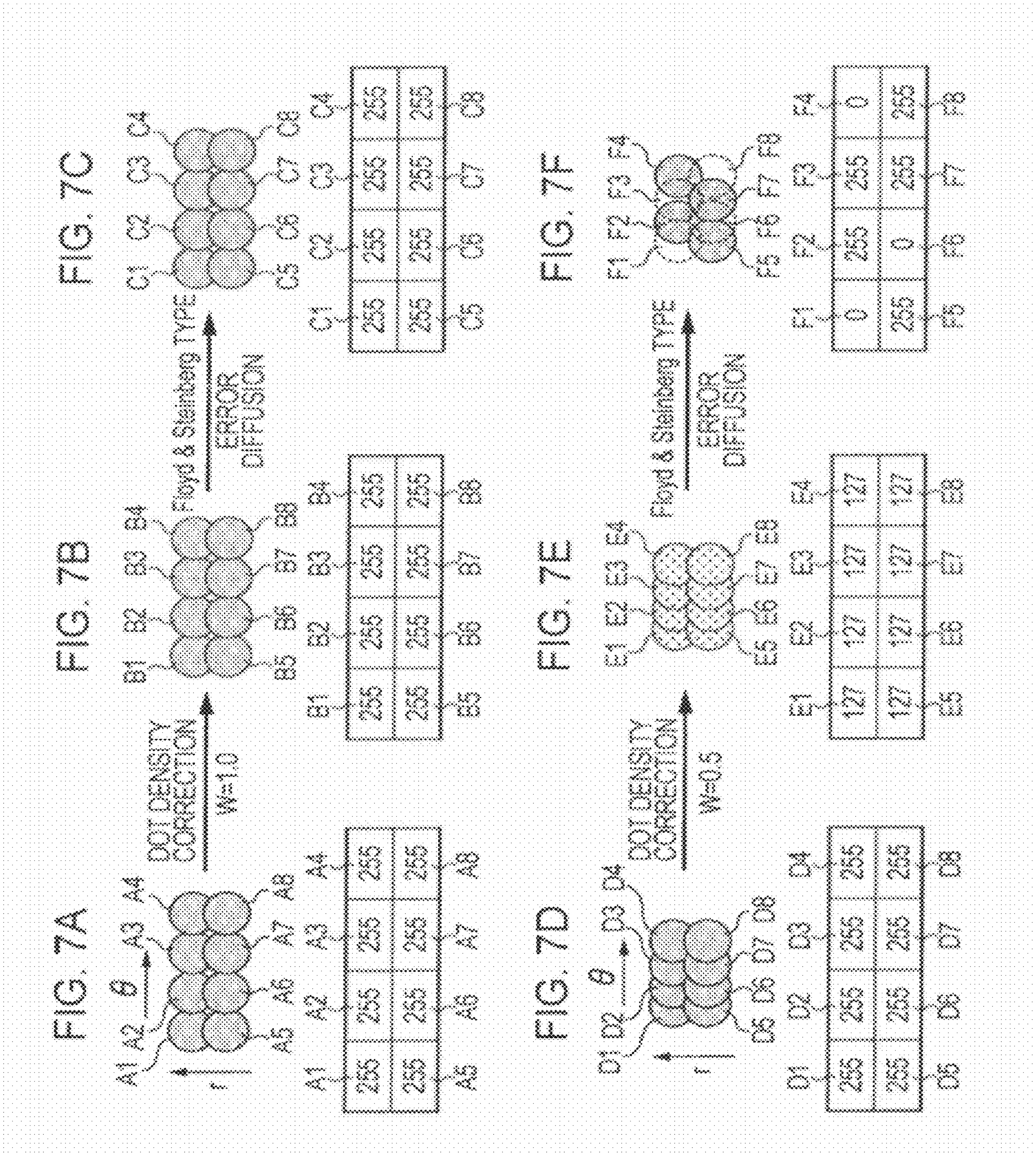
FIGS. 7A to 7F illustrate binarization in the optical disc device, which is the printing device according to the first embodiment of the present invention.

FIG. 7A shows dots A1 to A4 positioned at the outermost periphery of the polar coordinate data and having a radius value $r_N$ of 60 mm, and dots A5 to A8 positioned one line inside the dots A1 to A4 and having a radius value $r_{N-1}$ of approximately 60 mm (less than 60 mm). The gradation values of these dots A1 to A8 are all 255.

FIG. 7B shows dots B1 to B8 of the dot-corrected polar coordinate data generated by the correction weightings W added to the dots A1 to A8 in the polar coordinate data. The correction weightings W are calculated by the following expression:

$$W(d_{ij})=r_i/r_N$$

Therefore, the correction weighting $W_N$ for the dots A1 to A4 is 1.0, and a correction weighting $W_{N-1}$ for the dots A5 to A8 is approximately 1.0. As a result, the gradation values of the dots B1 to B8 in the dot correction data are all 255.

FIG. 7C shows dots C1 to C8 in binarized polar coordinate data generated by binarization by performing Floyd & Steinberg error diffusion (with a threshold of 128) on the dots B1 to B8 in the dot-corrected polar coordinate data. The gradation values of the dots C1 to C8 of the binarized polar coordinate data are all 255. As a result, ink drops are dripped onto positions on the label surface 101*a* of the optical disc 101 corresponding to the dots C1 to C8.

FIG. 7D shows dots D1 to D4 in the polar coordinate data having a radius $r_i$ of 30 mm, and dots D5 to D8 positioned one line inside the dots D1 to D4 and having a radius $r_i$ of approximately 30 mm. The gradation values of the dots D1 to D8 are all 255.

FIG. 7E shows dots E1 to E8 of the dot-corrected polar coordinate data generated by adding the correction weightings W to the dots D1 to D8 in the polar coordinate data. In this case, correction weighting $W_i$ for the dots D1 to D4 is 0.5, and correction weighting $W_{i-1}$ for the dots D5 to D8 is approximately 0.5. As a result, the gradation values of the dots E1 to E8 in the dot-corrected polar coordinate data are all 127 (digits following a decimal point are discarded).

FIG. 7F shows dots F1 to F8 of binarized polar coordinate data generated by binarization by performing Floyd & Steinberg error diffusion (with a threshold of 128) on the dots E1 to E8 in the dot-corrected polar coordinate data. The gradation values of the dots F1, F3, F6, and F8 in the binarized polar coordinate data become 0, and the gradation values of the dots F2, F4, F5, and F7 become 255. As a result, ink drops are dripped onto the positions on the label surface 101*a* of the optical disc 101 corresponding to the dots F2, F4, F5, and F7, and ink drops are not dripped onto the positions on the label surface 101*a* of the optical disc 101 corresponding to the dots F1, F3, F6, and F8.

In this way, by the binarization by the error diffusion method after performing the dot density correction on the polar coordinate data, it is possible to reduce the number of ink drops that are discharged in accordance with visible information as the distance from the inner periphery of the label surface 101*a* is reduced. As a result, it is possible to make the print density substantially uniform in the inner and outer peripheries of the label surface 101*a*. In addition to the Floyd & Steinberg method, the Jarvis, Judice & Ninke method may also be used as the error diffusion method.

Description of Correcting Landing Position

Next, landing position correction (that is, the operation performed in Step S5 in the flowchart shown in FIG. 4) performed on the binarized polar coordinate data will be described.

Figure 8A:
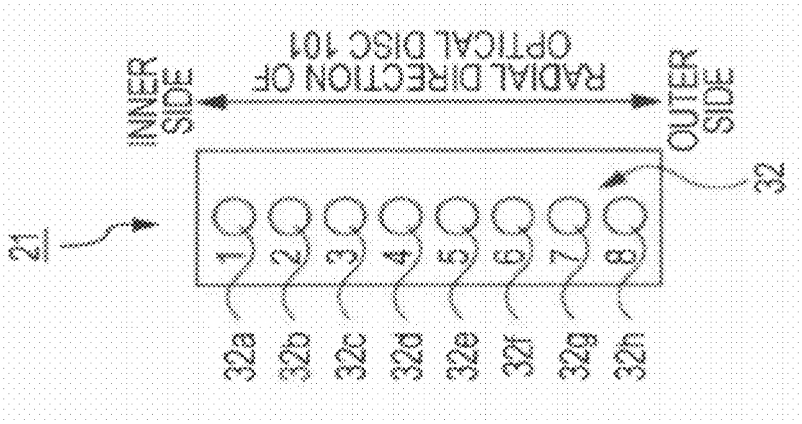
FIG. 8A illustrates a print head of the optical disc device, which is the printing device according to the first embodiment of the present invention.
Figure 8B:
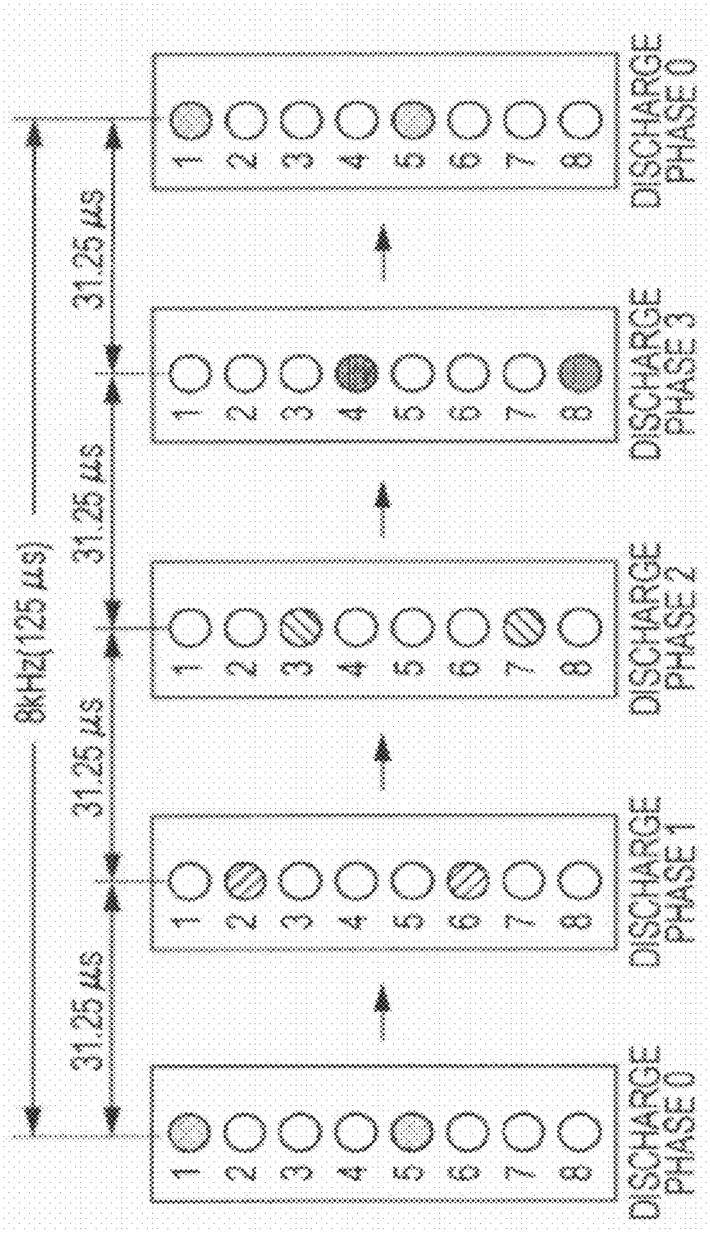
FIG. 8B illustrates discharge timings of ink drops that are discharged from the print head.

FIG. 8A illustrates the print head 21, and FIG. 8B illustrates discharge timings of ink drops that are discharged from the print head 21.

As shown in FIG. 8A, the discharge nozzle row 32 for cyan (C) provided at the print head 21 includes eight discharge nozzles 32*a* to 32*h* arranged in a radial direction of the optical disc 101.

In a state in which the nozzle row faces the label surface 101*a* of the optical disc 101, the discharge nozzle 32*a* is disposed at the inner peripheral side of the optical disc 101, and the discharge nozzle 32*h* is disposed at the outer peripheral side of the optical disc 101.

Although, in addition to the discharge nozzle row 32, the discharge nozzle rows 33 to 35 are provided at the print head 21, the discharge nozzle rows 33 to 35 are not shown. As with the discharge nozzle row 32, the discharge nozzle rows 33 to 35 each include eight discharge nozzles. Since the discharge timings of ink drops in the discharge nozzle rows 33 to 35 are the same as that in the discharge nozzle row 32, the correction of landing positions will be described by only taking the discharge nozzle 32 as an example.

As shown in FIG. 8B, the discharge nozzles 32*a* to 32*h* are driven by dividing the discharge timing of ink drops into four. That is, the discharge nozzles 32*a* to 32*h* discharge two ink drips in one timing.

For example, first, the timing in which ink drops are discharged is set as discharge phase 0, and ink drops are discharged from the two discharge nozzles 32*a* and 32*e* in the discharge phase 0. Then, a timing following the discharge phase 0 is set as discharge phase 1, and ink drops are discharged from the two discharge nozzles 32*b* and 32*f* in the discharge phase 1. Similarly, in discharge phase 2, ink drops are discharged from the two discharge nozzles 32*c* and 32*g*; and, in discharge phase 3, ink drops are discharged from the two discharge nozzles 32*d* and 32*h*.

In the embodiment, the print head 21 is designed so that, when it is driven at 8 kHz (125 μs), ink drops are discharged from the discharge phase 0 to the discharge phase 3 during the driving of the print head 21. In this case, the interval (that is, delay time) between the timings of discharging ink drops is 31.25 μs.

Here, the displacements in the landing positions of the ink drops will be described with reference to FIGS. 9 and 10.

Figure 9:
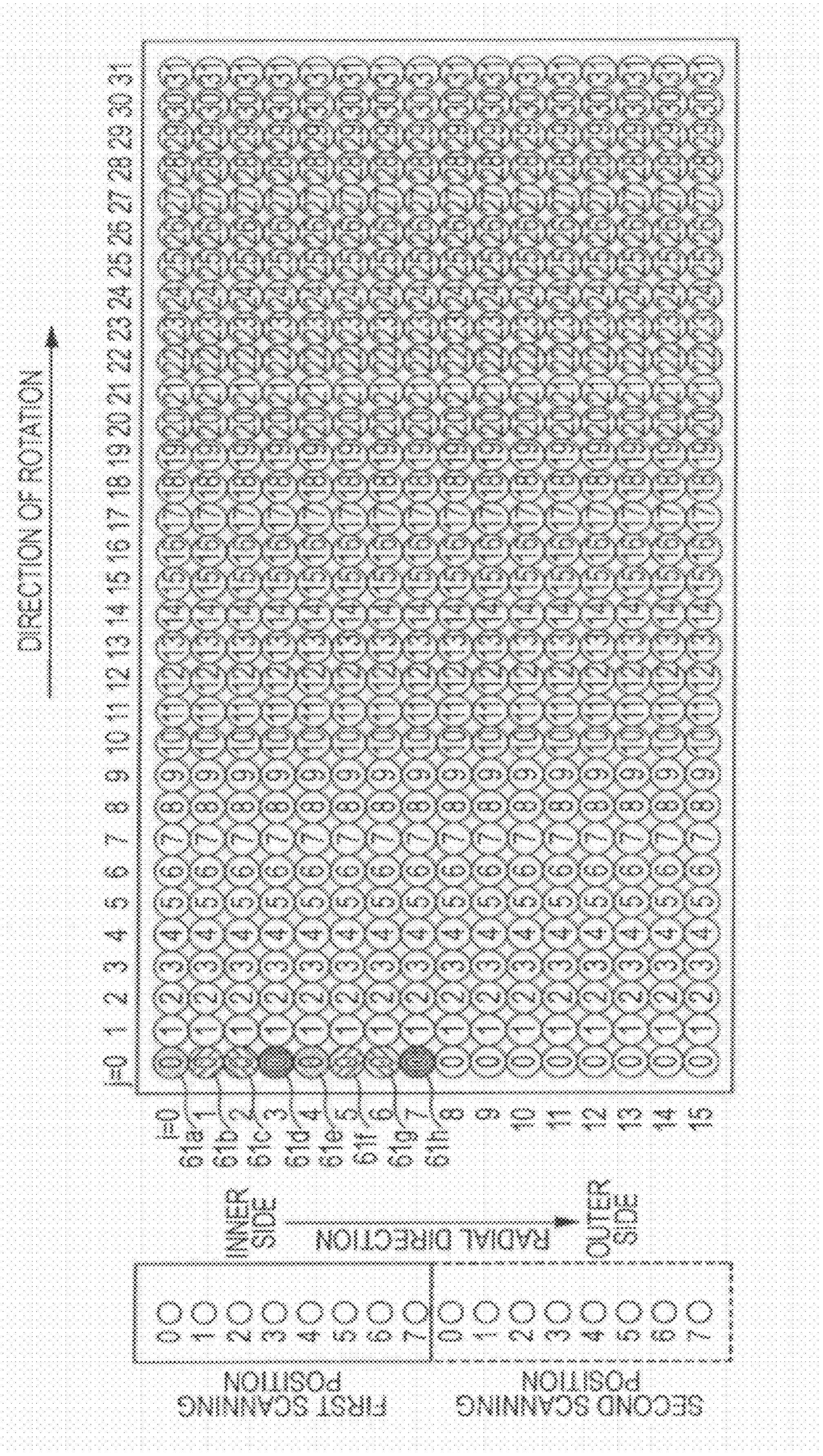
FIG. 9 illustrates binarized polar coordinate data in the optical disc device, which is the printing device according to the first embodiment of the present invention.
Figure 10:
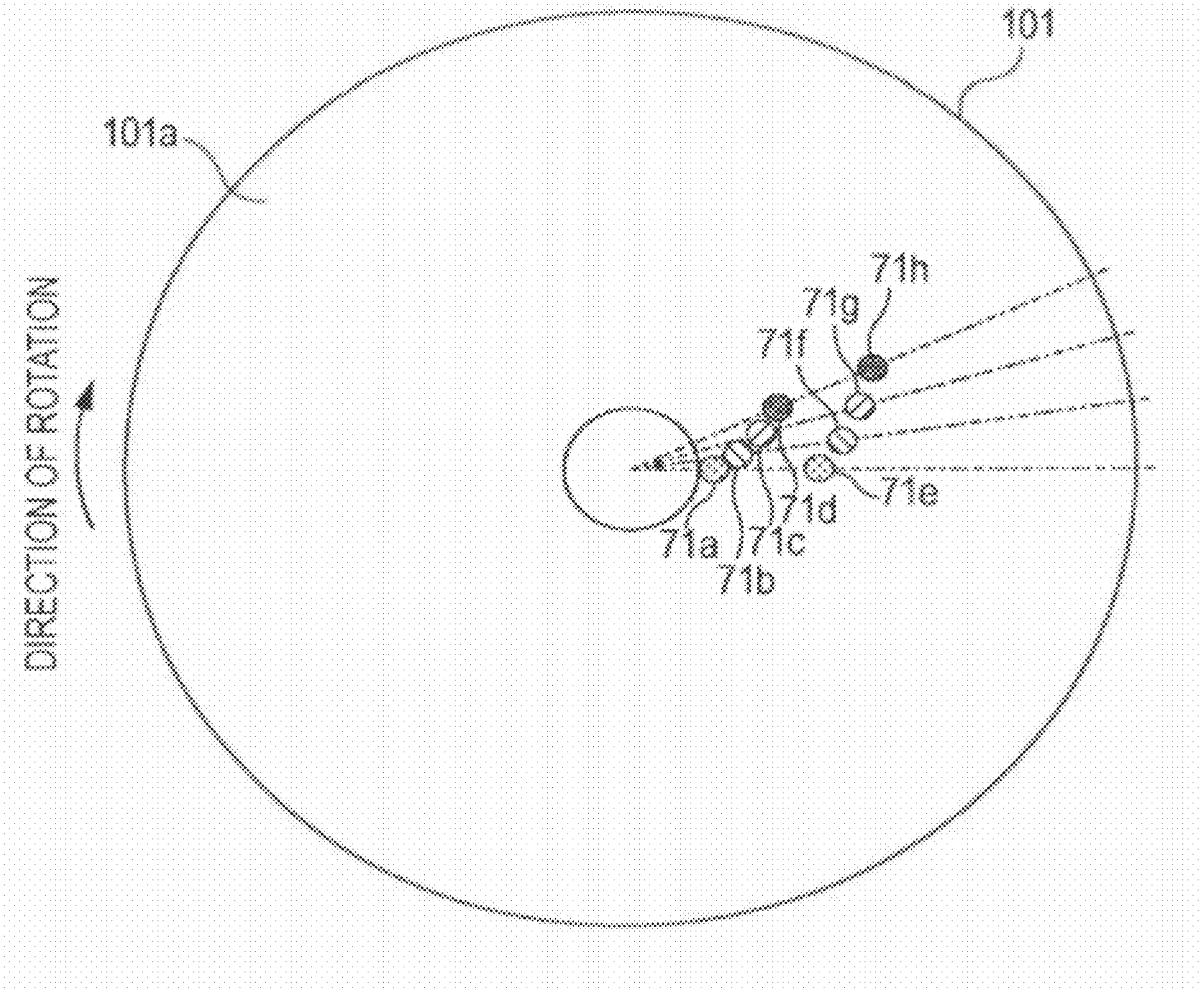
FIG. 10 illustrates landing positions of the ink drops that are discharged on the basis of the binarized polar coordinate data according to the first embodiment of the present invention.

FIG. 9 illustrates binarized polar coordinate data, and FIG. 10 illustrates the displacements in the landing positions of the ink drops that are discharged, the displacements occurring when the ink drops are discharged on the basis of the binarized polar coordinate data.

As shown in FIG. 9, it is assumed that the binarized polar coordinate data expresses visible information by a total of 512 dots $d_{ij}$ (hereunder referred to as "dots d") with the number of dots that are arranged in a radial direction of the optical disc 101 being 16 and the number of dots that are arranged in the direction of rotation of the optical disc 101 being 32. The position of each dot d is defined by coordinates (i, j), in which the coordinate i represents any of values 0 to 15, and in which the coordinate j represents any of values 0 to 31. In FIG. 9, a number added to each dot d expresses the value of the coordinate j of the coordinates (i, j).

When visible information is printed onto the label surface 101*a* on the basis of such binarized polar coordinate data, first, the print head 21 is disposed at a first scanning position, and ink drops are discharged on the basis of the dots d whose i values are from 0 to 7. Next, the print head 21 is disposed at a second scanning position, and ink drops are discharged on the basis of the dots d whose i values are from 8 to 15. This causes the visible information to be printed on the basis of 512 dots d.

For example, ink drops 71*a* to 71*h* (see FIG. 10) are discharged on the basis of eight dots 61*a* to 61*h* whose i values are from 0 to 7 and whose j values are 0, and are made to land onto the label surface 101*a* of the rotating optical disc 101. In this case, first, in the phase 0 (see FIG. 8B), the ink drops 71*a* and 71*e* based on the dots 61*a* and 61*e* are discharged from the discharge nozzles 32*a* and 32*e* of the print head 21.

Next, in the phase 1, the ink drops 71*b* and 71*f* based on the dots 61*b* and 61*f* are discharged from the discharge nozzles 32*b* and 32*f* of the print head 21. Next, in the phase 2, the ink drops 71*c* and 71*g* based on the dots 61*c* and 61*g* are discharged from the discharge nozzles 32*c* and 32*g* of the print head 21. Then, finally, in the phase 3, the ink drops 71*d* and 71*h* based on the dots 61*d* and 61*h* are discharged from the discharge nozzles 32*d* and 32*h* of the print head 21.

As a result, as shown in FIG. 10, the ink drops 71*b*, 71*c*, 71*d*, 71*f*, 71*g*, and 71*h* that have been discharged in the phases 1 to 3 land on positions that are displaced in a direction opposite to the direction of rotation of the optical disc 101 from positions on which they should actually land. That is, the ink drops 71*a* to 71*h* are discharged on the basis of the dots 61*a* to 61*h* arranged in a radial direction of the optical disc 101 in the binarized polar coordinate data. However, the ink drops 71*a* to 71*h* are not arranged in the radial direction of the optical disc 101 on the label surface 101*a* on which they land.

Next, the amounts of displacements of the landing positions will be described. When the phase number representing the order in which ink drops are discharged is n (n=0, 1, 2, . . . ) and an interval between timings of discharging the ink drops is Δt (sec), a displacement amount Δj of the landing position of each ink drop in a circumferential direction of the optical disc 101 is calculated by the following expression:

$$\Delta j = n \times \Delta t \times f \times T$$

where f is the number of rotations (rps) of the optical disc, and T is the number of dots in the direction of rotation.

In the embodiment, the interval Δt between the timings of discharging the ink drops is 31.25 μs, and the number of dots in the direction of rotation is 32. For example, when the number of rotations of the optical disc is 2000 rps, the displacement amount Δj of the landing position of each ink drop is:

$$\Delta j = n \times 31.25 \times 10^{-6} \times 2000 \times 32 = 2n$$

As a result, the displacement amounts of the landing positions of the ink drops are as follows:

(1) The displacement amount of the landing position of each ink drop discharged in the phase 0 (n=0) is 0.

(2) The displacement amount of the landing position of each ink drop discharged in the phase 1 (n=1) is 2.

(3) The displacement amount of the landing position of each ink drop discharged in the phase 2 (n=2) is 4.

(4) The displacement amount of the landing position of each ink drop discharged in the phase 3 (n=3) is 6.

Since the displacement amounts of the landing positions are determined by the number of dots (that is, the number of ink drops), for example, the ink drops that are discharged in the phase 1 are displaced by two dots in a direction opposite to the direction of rotation of the optical disc 101.

Therefore, in the embodiment, a landing-position correction operation is performed on the binarized polar coordinate data to generate ink discharge data in which the displacements of the landing positions of the ink drops are considered. That is, a landing-position correction operation refers to rearranging the positions (coordinate positions) of the dots d in the binarized polar coordinate data to the positions obtained by considering the displacements of the landing positions. In other words, the dot d at the coordinates (i, j) in the binarized polar coordinate data corresponds to coordinates (i, k) in the ink discharge data.

When the displacement amount of the landing position of each ink drop in the direction of rotation of the optical disc 101 is Δj, the aforementioned j and k satisfy the following relationships:

$$k=j+\Delta j,\ \text{when}\ j+\Delta j<T$$

$$k=j+\Delta j-T,\ \text{when}\ j+\Delta j\geqq T$$

where j=0, 1, 2, . . . T−1 k=0, 1, 2, . . . T−1

FIG. 10 illustrates the ink discharge data.

As shown in FIG. 10, similarly to the binarized polar coordinate data shown in FIG. 9, the ink discharge data expresses visible information by a total of 512 dots d, with the number of dots arranged in a radial direction of the optical disc 101 being 16 and the number of dots arranged in the direction of rotation of the optical disc 101 being 32.

The position of each dot d in the ink discharge data is defined by the coordinates (i, k). In the ink discharge data, the coordinate i in the coordinates (i, k) represents any of values 0 to 15, and the coordinate k represents any of values 0 to 31. In FIG. 10, a number added to each dot d expresses the value of the coordinate j in the coordinates (i, j) in the binarized polar coordinate data.

For example, the dot 61*b* (see FIG. 9) at the coordinates (1, 0) in the binarized polar coordinate data corresponds to an ink drop discharged in the phase 1 (n=1). Therefore, j=0, and the displacement amount Δj of the landing position of the ink drop is 2.

In this case, since j+Δj<T, the value of k in the coordinates (i, k) in the ink discharge data of the dot 61*b* is:

$$k=j+\Delta j$$

That is, $$k=0+2=2$$

Figure 11:
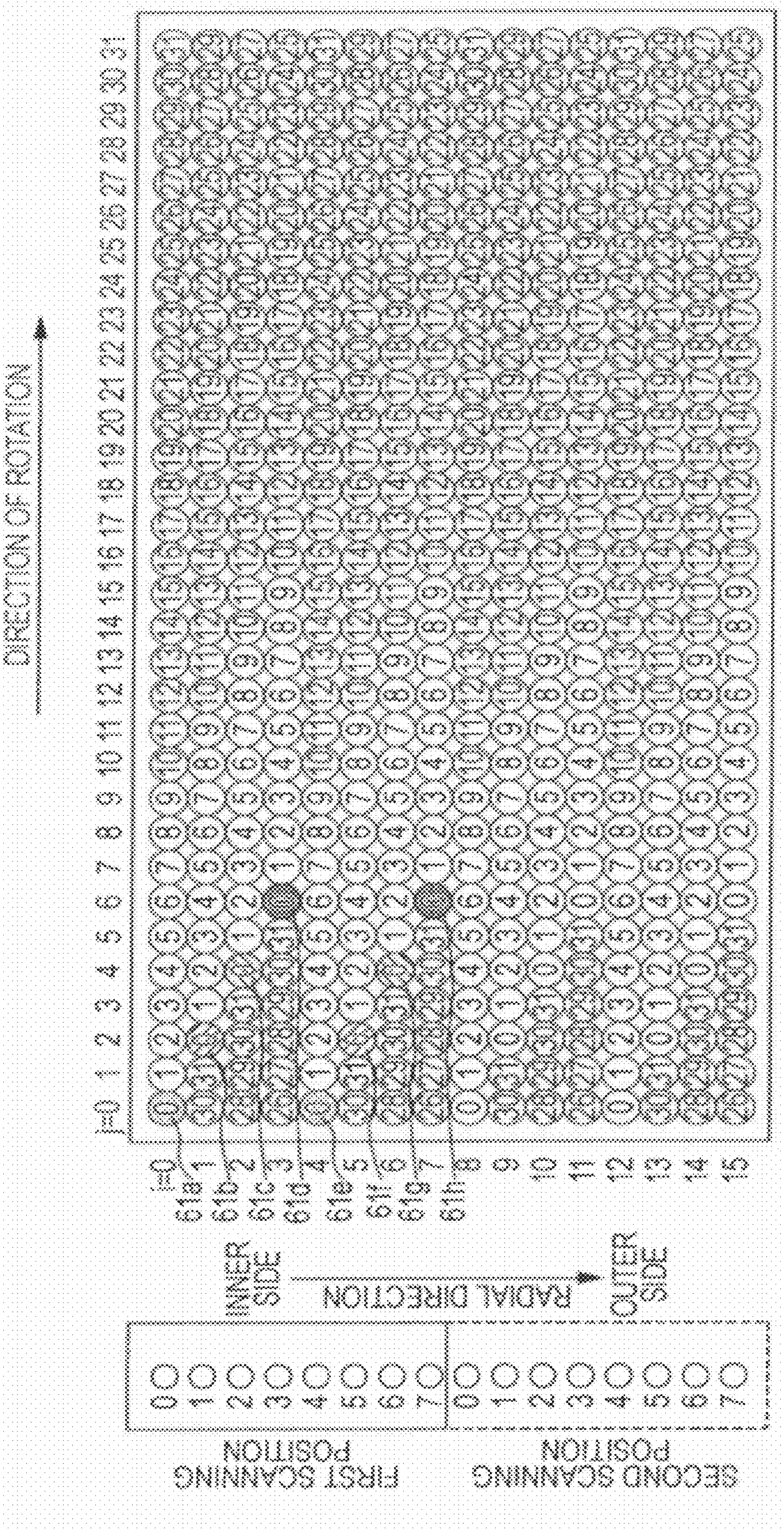
FIG. 11 illustrates ink discharge data in the optical disc device, which is the printing device according to the first embodiment of the present invention.

Therefore, as shown in FIG. 11, the coordinates of the dot 61*b* in the ink discharge data become (1, 2).

That is, in the embodiment, the landing-position correction operation is performed as follows:

(1) The dots d in which i=0, 4, 8, and 12 in the binarized polar coordinate data are not rearranged.

(2) The dots d in which i=1, 5, 9, and 13 in the binarized polar coordinate data are rearranged by shifting them by two dots in the direction of rotation of the optical disc 101.

(3) The dots d in which i=2, 6, 10, and 14 in the binarized polar coordinate data are rearranged by shifting them by four dots in the direction of rotation of the optical disc 101.

(4) The dots d in which i=3, 7, 11, and 15 in the binarized polar coordinate data are rearranged by shifting them by six dots in the direction of rotation of the optical disc 101.

When the ink drops are discharged from the print head 21 on the basis of the ink discharge data generated in this way, the ink drops are discharged considering the displacements of the landing positions of the ink drops.

For example, the ink drop discharged on the basis of the dot 61*b* in the ink discharge data lands on a position that is displaced by two dots in the direction opposite to the direction of rotation of the optical disc 101 from the position of the label surface 101*a* corresponding to the coordinates (1, 2). By this, the ink drop discharged on the basis of the dot 61*b* lands onto a position adjacent to the ink drop that is discharged onto and that lands on the label surface 101*a* in the radial direction of the optical disc 101 on the basis of the dot 61*a*.

The ink drop that is discharged on the basis of the dot 61*c* in the ink discharge data lands onto a position that is displaced by two dots in the direction opposite to the direction of rotation of the optical disc 101 from the position of the label surface 101*a* corresponding to the coordinates (2, 4). By this, the ink drop discharged on the basis of the dot 61*c* lands onto a position adjacent to the ink drop that is discharged onto and that lands on the label surface 101*a* in the radial direction of the optical disc 101 on the basis of the dot 61*b*.

In this way, the ink drops discharged on the basis of the dots 61*a* to 61*h* that are arranged in the radial direction of the optical disc 101 are arranged and lands in the radial direction of the optical disc 101. As a result, it is possible to prevent distortion from occurring in the visible information that is printed onto the label surface 101*a* of the optical disc 101.

Although, in the embodiment, the displacement amount Δj of the landing position of each ink drop is 2n, the displacement amount Δj of the landing position of each ink drop may be, for example, 1.5n. In this case, since the ink drops discharged in the phase 1 are displaced by 1.5 dots in the direction opposite to the direction of rotation of the optical disc 101, it is possible to, for example, round off numbers (raise fractions to unit, or omit fractions), and perform approximate calculations. This is because, since the actual displacement amount is from a few hundred dots to a few thousand dots, even if approximations are made in terms of a displacement amount of approximately 1 dot, the influence thereof on the visible information is small.

When the displacement amount Δj of each landing position is calculated, it is possible to adjust the interval Δt between the timings of discharging the ink drops or the value of the number of rotations f of the optical disc so that Δt×f×T becomes an integer (1, 2, 3, . . . ) that is equal to or greater than 1.

Description of Rearranging Data in Accordance with Head Position/Discharge Order Next, rearrangement of data in accordance with head position/discharge order (that is, the operation carried out in Step S5 in the flowchart shown in FIG. 4) will be described with reference to FIG. 11.

FIG. 11 illustrates a state in which the ink discharge data is rearranged in accordance with the head position/discharge order.

In the embodiment, first, the print head 21 is disposed at the first scanning position, and ink drops are discharged from the discharge nozzles. Then, when the discharging of the ink drops at the first scanning position ends, the print head 21 is disposed at the second scanning position and discharges ink drops from the discharge nozzles. This causes printing to be performed on the entire range of the label surface 101*a* of the optical disc 101. Therefore, in the embodiment, ink discharge data corresponding to the second scanning position is connected to a back end of ink discharge data corresponding to the first scanning position, so that, as shown in FIG. 11, the pieces of ink discharge data are rearranged in accordance with the head position/discharge order.

Although, in the embodiment, the timing of the discharge of ink drops is divided into four, the number of divisions of the timing of the discharge of ink drops is not limited thereto.

Obviously, the number of divisions of the timing of the discharge of ink drops in the present invention may be 3 or 2, or may be 5 or more.

Modification for when Ink Discharge Data is Generated

Next, a modification for when the ink discharge data is generated will be described with reference to FIG. 12.

Figure 12:
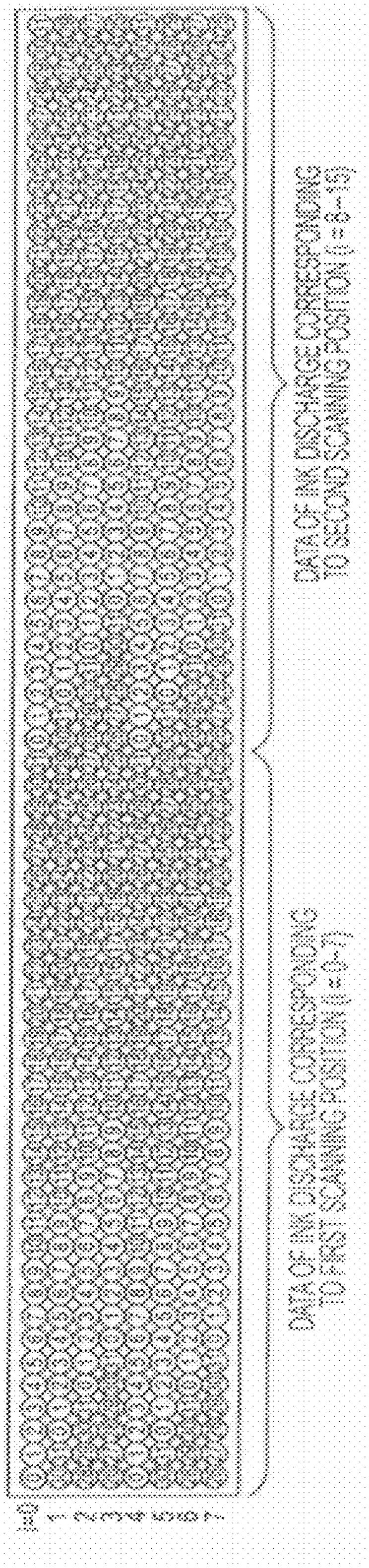
FIG. 12 illustrates a state in which pieces of ink discharge data in the optical disc device, which is the printing device according to the first embodiment of the present invention, are rearranged in accordance with head position/discharge order.
Figure 13:
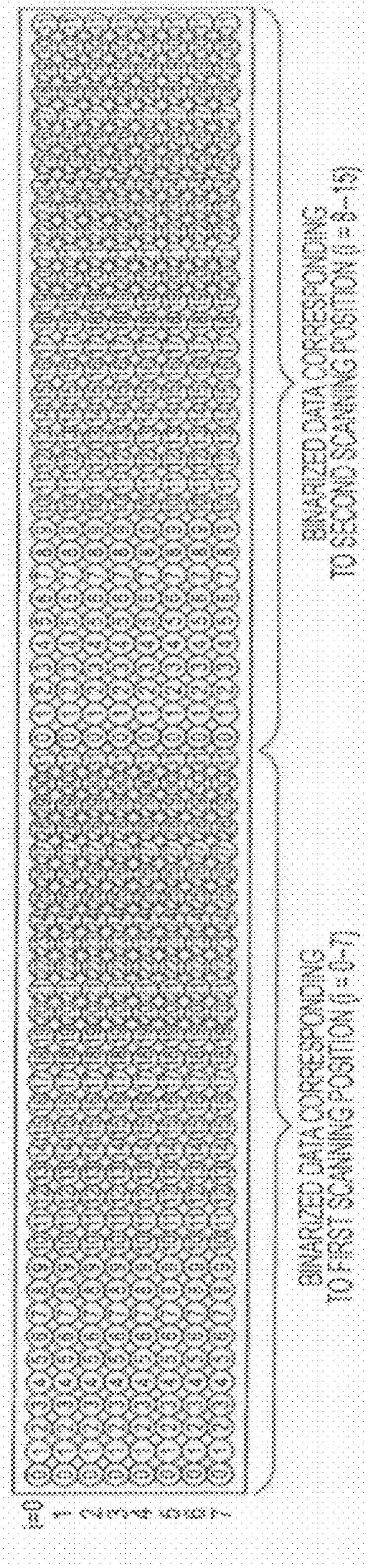
FIG. 13 illustrates a modification for when the ink discharge data is generated from the binarized polar coordinate data in the optical disc device, which is the printing device according to the first embodiment of the present invention.

FIG. 12 illustrates a modification for when the ink discharge data is generated from the binarized polar coordinate data.

When generating the ink discharge data according to the modification of the present invention, as shown in FIG. 12, pieces of binarized polar coordinate data may rearranged in accordance with discharge order prior to correcting the landing positions. In this case, the landing-position corrections for the binarized polar coordinate data corresponding to the first scanning position and those for the binarized polar coordinate data corresponding to the second scanning position are performed separately from each other. By this, as shown in FIG. 11, the pieces of ink discharge data that are rearranged in accordance with head position are generated.

ADVANTAGES OF THE EMBODIMENT

According to the optical disc device 1 of the embodiment, the ink discharge data is generated by performing the landing position correction operations (for correcting the displacements of the landing positions of ink drops caused by the order in which the ink drops are discharged from the discharge nozzles) on the binarized polar coordinate data. Therefore, it is possible to perform printing in which the displacements of the landing positions of the ink drops are considered, and to prevent distortion from occurring in the visible information printed onto the label surface 101*a* of the optical disc 101.

According to the optical disc device 1 of the embodiment, the displacement amount Δj of the landing position of each ink drop is calculated using the following expression so that the displacement amount Δj is calculated as the number of dots (that is, the number of ink drops):

$$\Delta j = n \times \Delta t \times f \times T$$

where n is the phase number representing the order in which ink drops are discharged from the discharge nozzles, Δt is the interval (s) between timings of discharge of ink drops, f is the number of rotations (rps) of the print object, and T is the number of print dots in the direction of rotation.

Therefore, the landing positions can be very easily corrected by only rearranging the positions of the dots in the binarized polar coordinate data to the positions obtained by considering the displacements in the landing positions.

According to the optical disc device 1 of the embodiment, a dot d at the coordinates (i, j) in the binarized polar coordinate data is made to correspond to the coordinates (i, k) in the ink discharge data, to correct the landing position. When the displacement amount of the landing position of the ink drop is Δj, j and k satisfy the following relationships:

$$k = j + \Delta j, \text{ when } j + \Delta j < T$$

$$k = j + \Delta j - T, \text{ when } j + \Delta j \geqq T$$

where j=0, 1, 2, . . . T−1 k=0, 1, 2, . . . T−1

This makes it possible for all of the dots arranged in the form of a ring in the direction of rotation of the optical disc 101 to be rearranged to the positions obtained by considering the displacements in the landing positions.

According to the optical disc device 1 of the embodiment, the data expressed by the biaxial orthogonal coordinates is converted into polar coordinate data expressed by the polar coordinates, and, then, the landing positions are corrected. Therefore, the calculation for the polar coordinate conversion can be easily performed. Here, the reason why the calculation for the polar coordinate conversion can be easily performed will be described.

For example, when the data expressed by the biaxial orthogonal coordinates is converted into the polar coordinate data, it is possible to perform the landing position correction operation for correcting the displacements of the landing positions of the ink drops. In this case, when each dot in the polar coordinate data on which the landing position correction operation has been performed is expressed as dot $d_{ij}$, and the coordinates of the biaxial orthogonal coordinate data corresponding to the dot $d_{ij}$ are (X, Y), the coordinates ($r_i$, $\theta_j$) of the dot $d_{ij}$ in the polar coordinate data on which the landing position correction has been performed are calculated by the following expressions:

$$X = r_i \cos(\theta_j + \Delta\theta_m)$$

$$Y = r_i \sin(\theta_j + \Delta\theta_m)$$

where $\theta_m$ is the displacement amount of angular position at the landing position of the ink drop corresponding to the dot $d_{ij}$ due to a difference in discharge timing.

Accordingly, if the displacement of the landing position of each ink drop is corrected when the data expressed by the biaxial orthogonal coordinates is converted into the polar coordinate data, calculation using trigonometric functions with respect to each dot $d_{ij}$ is performed. In the calculation using trigonometric functions, since calculation load caused by a program is large, the calculation for the polar coordinate conversion becomes complicated.

To overcome this problem, in the optical disc device 1 according to the embodiment, as described above, the data expressed by the biaxial orthogonal coordinates is converted into the polar coordinate data expressed by the polar coordinates, and, then, the landing positions are corrected. Therefore, when the dot $d_{ij}$ at the innermost peripheral position and the dot $d_{ij}$ at the outermost peripheral position (which is angularly the same as the innermost peripheral position) are calculated using trigonometric functions, the coordinates of the dot $d_{ij}$ therebetween can be calculated by linear interpolation. That is, in the optical disc device 1 according to the embodiment, it is possible to reduce the number of calculations using trigonometric functions for performing the polar coordinate conversion, so that the calculation for the polar coordinate conversion can be easily performed.

If the displacement of the landing position of each ink drop is corrected when the data expressed by the biaxial orthogonal coordinates is converted into the polar coordinate data, displacement occurs in the arrangement of the dots $d_{ij}$ at this moment. When the polar coordinate data in which the displacement in the arrangement of the dots $d_{ij}$ has occurred is binarized by the Floyd & Steinberg error diffusion, errors cannot be properly diffused. Therefore, an operation for specifying dots for diffusing the errors from the arrangement of the dots $d_{ij}$ prior to the displacement is carried out. This complicates the binarization of the polar coordinate data.

To overcome this problem, in the optical disc device 1 according to the embodiment, the polar coordinate data is binarized to generate binarized polar coordinate data. Then, the landing positions are corrected. Therefore, when the Floyd & Steinberg error diffusion is performed, since displacement does not occur in the arrangement of the dots $d_{ij}$, the polar coordinate data can be easily binarized.

In addition, according to the optical disc device 1 of the embodiment, the dot density correction which adds correction weightings calculated in accordance with the number of dots per unit area centered on the dots to the brightness values of the dots in the polar coordinate data is performed. Then, the dot correction data calculated by the dot density correction is binarized by the error diffusion method. As a result, the closer to the inner periphery of the label surface 101*a* of the optical disc 101, it is possible to omit discharge of extra ink drops, so that visible information can be printed at a substantially uniform density.

The present application contains subject matter related to that disclosed in Japanese Priority Patent Application JP filed in the Japan Patent Office on May 30, 2008, the entire content of which is hereby incorporated by reference.

The present invention is not limited to the above-described embodiment illustrated in the drawings, so that various modifications can be made without departing from the gist according to the present invention. For example, although, in the embodiment, an optical disc device is used as an example of a printing device, the optical disc device may be used in various electronic apparatuses, such as a personal computer or a DVD recorder.

What is claimed is:

1. A printing device comprising:

a rotationally driving section that rotates a print object;

a print head having a plurality of discharge nozzles arranged in a radial direction of a circle traced by the print object being rotated by the rotationally driving section, the print head discharging ink drops at two or more timings from the discharge nozzles; and a controlling section that converts visible information, expressed using biaxial orthogonal coordinate data, into polar coordinate data; binarizes the polar coordinate data to generate binarized polar coordinate data; then, performs landing position correction to correct displacements in landing positions of the ink drops, the displacements being caused by the order in which the ink drops are discharged from the discharge nozzles; generates ink discharge data from the binarized polar coordinate data; and causes the ink drops to be discharged on the basis of the ink discharge data from the print head onto the print object being rotated by the rotationally driving section, wherein when a phase number representing the order in which the ink drop is discharged from each discharge nozzle of the print head is n (n=0, 1, 2, . . . ) and an interval between the timings of discharging the ink drops is Δt(sec), a displacement amount Δj of the landing position of each ink drop corresponding to a dot d at coordinates (i, j) in the binarized polar coordinate data is calculated by the following expression:

$$\Delta j = n \times \Delta t \times f \times T$$

where f is the number of rotations (rps) of the print object, and T is the number of print dots in a direction of rotation.

2. The printing device according to claim 1, wherein the landing position correction causes the dot d at the coordinates (i, j) in the binarized polar coordinate data to correspond to coordinates (i, k) in the ink discharge data, and wherein j and k satisfy the following relationships:

$$k = j + \Delta j, \text{ when } j + \Delta j < T$$

$$k = j + \Delta j - T, \text{ when } j + \Delta j \geqq T$$

where j=0, 1, 2, . . . T−1 k=0, 1, 2, . . . T−1.

3. The printing device according to claim 2, wherein the controlling section generates the binarized polar coordinate data after performing dot density correction that adds a correction weighting calculated in accordance with the number of dots per unit area to a brightness value of each dot in the polar coordinate data.

4. A printing method comprising the steps of:

converting visible information expressed using biaxial orthogonal coordinate data into polar coordinate data;

generating binarized polar coordinate data by binarizing the polar coordinate data;

generating ink discharge data from the binarized polar coordinate data by performing landing position correction to correct displacements in landing positions of ink drops, the displacements being caused by the order in which the ink drops are discharged from discharge nozzles provided at a print head; and printing the visible information onto a print object by discharging the ink drops at two or more timings from the print head on the basis of the ink discharge data, the print object being rotated by a rotationally driving section, wherein when a phase number representing the order in which the ink drop is discharged from each discharge nozzle of the print head is n (n=0, 1, 2, . . . ) and an interval between the timings of discharging the ink drops is Δt(sec), a displacement amount Δj of the landing position of each ink drop corresponding to a dot d at coordinates (i, j) in the binarized polar coordinate data is calculated by the following expression:

$$\Delta j = n \times \Delta t \times f \times T$$

where f is the number of rotations (rps) of the print object, and T is the number of print dots in a direction of rotation.

5. A non-transitory computer-readable medium including a program, which when executed by a printing device, that causes the printing device to execute the steps of:

converting visible information expressed using biaxial orthogonal coordinate data into polar coordinate data;

generating binarized polar coordinate data by binarizing the polar coordinate data;

generating ink discharge data from the binarized polar coordinate data by performing landing position correction to correct displacements in landing positions of ink drops, the displacements being caused by the order in which the ink drops are discharged from discharge nozzles provided at a print head; and discharging the ink drops at two or more timings from the print head on the basis of the ink discharge data, wherein when a phase number representing the order in which the ink drop is discharged from each discharge nozzle of the print head is n (n=0, 1, 2, . . . ) and an interval between the timings of discharging the ink drops is Δt(sec), a displacement amount Δj of the landing position of each ink drop corresponding to a dot d at coordinates (i, j) in the binarized polar coordinate data is calculated by the following expression:

$$\Delta j = n \times \Delta t \times f \times T$$

where f is the number of rotations (rps) of the print object, and T is the number of print dots in a direction of rotation.

* * * * *